Patented July 28, 1925.

1,547,555

UNITED STATES PATENT OFFICE.

MAX BÖGEMANN, OF ELBERFELD, PAUL IMHOFF, OF LEVERKUSEN, NEAR COLOGNE, AND WILHELM SCHEPSS, OF WIESDORF, NEAR COLOGNE, GERMANY, ASSIGNORS TO FARBENFABRIKEN VORM. FRIEDR. BAYER AND CO., OF LEVERKUSEN, NEAR COLOGNE-ON-THE-RHINE, GERMANY.

MANUFACTURE OF VULCANIZED RUBBER.

No Drawing.   Application filed February 24, 1925. Serial No. 11,348.

*To all whom it may concern:*

Be it known that we, (1) MAX BÖGEMANN, (2) PAUL IMHOFF, and (3) WILHELM SCHEPSS, citizens of Germany, residing at (1) Elberfeld, (2) Leverkusen, near Cologne, and (3) Wiesdorf, near Cologne, State of Prussia, Germany, have invented new and useful Improvements in the Manufacture of Vulcanized Rubber, of which the following is a specification.

In Patents 1,126,469 and 1,149,580 there are described processes for materially promoting the vulcanization of rubber by the use of bases such as piperidine or its derivatives, etc.

We have now found that certain di- or polymer hydrogenated heterocyclic compounds can be used to great advantage for promoting the vulcanization of caoutchouc substances. We refer specifically to the di- and polymer hydroquinoline bases as obtained, i. e., from quinoline substances by electrolytic reduction, according to F. B. Ahrens, Zeitschrift für Elektrochemie, vol. 2, page 580 (1895) or by any other suitable means. Amongst such products the trimolecular dihydroquinolin $(C_9H_9N)_3$ and the trimolecular dihydroquinaldine $(C_{10}H_{11}N)_3$ can be easily obtained and are available for technical use.

These products can be used as such. Salts and derivatives of such hydrogenated heterocyclic compounds show the same valuable accelerating action. Such salts and derivatives are for instance: trimolecular dihydroquinolines (chlorohydrate and sulfate) of the formula:

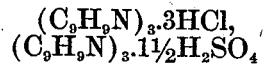

and

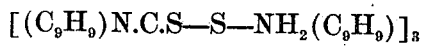

(dihydroquinoline - dithiocarbamate) and the salts of the trimolecular dihydroquinaldines, such as the chlorohydrate of dihydroquinaldine of the formula:

These products are slightly coloured bodies having a very high melting point.

The following example further illustrates the new process, the parts being by weight:

*Example.*—A mixture of 100 parts by weight of smoked sheets, 10 parts by weight of zinc oxide, 6 parts by weight of sulfur and 1 part by weight of tetrahydroquinoline are vulcanized during 30 minutes under a pressure of 3 atmospheres (133° C.). A vulcanized rubber of excellent qualities results.

This application is a continuation in part of application 717,639 filed June 3rd, 1924.

We claim:—

1. The process of producing a vulcanized rubber which comprises incorporating into rubber a small amount of a di-mer hydrogenated quinoline compound and heating the resulting product with a vulcanizing agent to effect vulcanization.

2. The process of producing a vulcanized rubber which comprises incorporating into rubber a small amount of a polymer hydrogenated quinoline compound and heating the resulting product with a vulcanization agent to effect vulcanization.

3. The process of producing a vulcanized rubber which comprises incorporating into rubber a small amount of a salt of a di-mer hydrogenated quinoline compound and heating the resulting product with a vulcanization agent to effect vulcanization.

4. The process of producing a vulcanized rubber which comprises incorporating into rubber a small amount of a salt of a polymer hydrogenated quinoline compound and heating the resulting product with a vulcanization agent to effect vulcanization.

5. The process of producing vulcanized rubber which comprises incorporating into rubber a small amount of a derivative of a di-mer hydrogenated quinoline compound and heating the resulting product with a vulcanization agent to effect vulcanization.

6. The process of producing vulcanized rubber which comprises incorporating into rubber a small amount of a derivative of a polymer hydrogenated quinoline compound and heating the resulting product with a vulcanization agent to effect vulcanization.

7. As a new article of manufacture a vulcanized rubber combined before vulcanization with a small amount of a di-mer hydrogenated quinoline compound.

8. As a new article of manufacture a vulcanized rubber combination before vulcanization with a small amount of a polymer hydrogenated quinoline compound.

9. As a new article of manufacture a vulcanized rubber combined before vulcanization with a small amount of a salt of a di-mer hydrogenated quinoline compound.

10. As a new article of manufacture a vulcanized rubber combined before vulcanization with a small amount of a salt of a polymer hydrogenated quinoline compound.

11. As a new article of manufacture a vulcanized rubber combined before vulcanization with a small amount of a derivative of a di-mer hydrogenated quinoline compound.

12. As a new article of manufacture a vulcanized rubber combined before vulcanization with a small amount of a derivative of a polymer hydrogenated quinoline compound.

In testimony whereof we have hereunto set our hands.

MAX BÖGEMANN.
PAUL IMHOFF.
WILHELM SCHEPSS.